(12) United States Patent
Tenant de la Tour et al.

(10) Patent No.: US 9,769,625 B2
(45) Date of Patent: Sep. 19, 2017

(54) MOBILE DEVICE DETECTION AND TRACKING

(71) Applicant: Bluefox, Inc., Saratoga, CA (US)

(72) Inventors: Guillaume Tenant de la Tour, Saratoga, CA (US); Jan Willem Korver, Taipei (TW)

(73) Assignee: BLUEFOX, INC., Saratoga, CA (US)

( * ) Notice: Subject to any disclaimer, the term of this patent is extended or adjusted under 35 U.S.C. 154(b) by 0 days.

(21) Appl. No.: 15/006,057

(22) Filed: Jan. 25, 2016

(65) Prior Publication Data

US 2016/0219411 A1     Jul. 28, 2016

Related U.S. Application Data

(60) Provisional application No. 62/107,193, filed on Jan. 23, 2015.

(51) Int. Cl.
*H04W 24/00* (2009.01)
*H04W 4/04* (2009.01)

(52) U.S. Cl.
CPC ....................... *H04W 4/04* (2013.01)

(58) Field of Classification Search
CPC ........................................ H04W 4/04
USPC ....................................... 455/456.6
See application file for complete search history.

(56) References Cited

U.S. PATENT DOCUMENTS

| 7,733,836 B2 * | 6/2010 | Huseth .................. G01S 5/021 370/338 |
| 7,856,656 B1 | 12/2010 | Kharvandikar et al. |
| 9,344,992 B2 * | 5/2016 | Noonan ................ H04W 48/04 |
| 2012/0190325 A1 | 7/2012 | Abu-Hakima et al. |
| 2013/0290200 A1 | 10/2013 | Singhal et al. |
| 2014/0195380 A1 | 7/2014 | Jamtgaard et al. |

(Continued)

FOREIGN PATENT DOCUMENTS

| RU | 2011127863 A | 1/2013 |
| RU | 126862 U1 | 4/2013 |

(Continued)

OTHER PUBLICATIONS

International Search Report and Written Opinion mailed Mar. 30, 2017, for International Application No. PCT/US2017/17018, 5 pages.

(Continued)

*Primary Examiner* — Amancio Gonzalez
(74) *Attorney, Agent, or Firm* — Perkins Coie LLP

(57) ABSTRACT

Mobile devices emit signals in Bluetooth, Wi-Fi and cellular (i.e. 2G, 3G, 4G, Edge, H+, etc.). These signals attempt to connect to paired devices, hotspots, cell towers, or other suitable wireless connection points to greater networks. In order to connect to connect to hotspots mobile devices send out identifying data to establish a connection. Hotspots may unobtrusively collect the identification data of the mobile device, and then reject the connection request. The hotspots collect data in real time on the mobile device, and by association, the human carrying the mobile device without having alerted or impeded the human carrier. The system uses analytical software to determine, for example, an approaching unique ID user's presence, history, frequency of visits, duration of presence and so on.

22 Claims, 9 Drawing Sheets

(56) References Cited

U.S. PATENT DOCUMENTS

2015/0025937 A1    1/2015  Turner, Jr.
2016/0286624 A1*  9/2016  Patel .................. H05B 37/0218

FOREIGN PATENT DOCUMENTS

WO        2014035307 A1    3/2014
WO        2014035308 A1    3/2014

OTHER PUBLICATIONS

U.S. Appl. No. 15/426,945 of Mills, A. et al. filed Feb. 7, 2017.
U.S. Appl. No. 15/426,953 of Ung, H. et al. filed Feb. 7, 2017.
International Search Report and Written Opinion dated Jun. 29, 2017, for International Patent Application No. PCT/US2017/017015, filed Feb. 8, 2017, 8 pages.

* cited by examiner

In WiFi

LGMS323
- Near (<10cm)
- Far (>1m)

Same in an interval of -30 to -80

LGMS500
- Near (<10cm)
- Far (>1m)

Same in an interval of -30 to -80

Samsung Near
- Near (<10cm)
- Far (>1m)

Same in an interval of -30 to -80

MOBILE DEVICE DETECTION AND TRACKING

CLAIM FOR PRIORITY

The presently filed application claims priority to U.S. Provisional Application No. 62/107,193, entitled "System and Method for Managing Digital Display Systems", filed Jan. 23, 2015. The provisional application is hereby incorporated by reference in its entirety.

TECHNICAL FIELD

Teachings relate to electronic data management and more specifically, but not exclusively, to unobtrusively tracking mobile devices without installed applications or opt-in.

BACKGROUND

For many years, people have been able to track visitors, clicks, and other sorts of traffic on web pages and web stores. This tracking data provides valuable analytic data for marketers on what parts of a web site are getting the most traction, visibility, and how best to move products using a web store. Importantly, the analytical data is received and analyzed in real-time. Users know immediately what part of the website get the most traffic.

In the physically perceivable world, the desire for similar analytic and marketing data has existed for even longer, yet creating the same sort of data in real-time has proven challenging. Marketers have had to set up cameras to record traffic through an area, later review all the camera footage, and analyze.

DETAILED DESCRIPTION

Mobile devices such as cellular phones, tablets, or other portable networked devices emit signals in Bluetooth, Wi-Fi and cellular (i.e. 2G, 3G, 4G, Edge, H+, etc.). These signals attempt to connect to paired devices, hotspots, cell towers, or other suitable wireless connection points to greater networks ("hotspots"). In order to connect to connect to hotspots mobile devices send out identifying data to establish a connection.

If the mobile device is tricked into attempting connections with a network transceiver disguised as a hotspot, the fake hotspot may unobtrusively collect the identification data of the mobile device, and then reject the connection request. The fake hotspot has collected data in real time on the mobile device, and by association, the human carrying the mobile device without having alerted or impeded the human carrier. The system uses analytical software to determine, for example, an approaching unique ID user's presence, history, frequency of visits, duration of presence and so on. The type of data available to the fake hotspots varies based on a number of details such as the kind of hot spot used.

Figure 1:
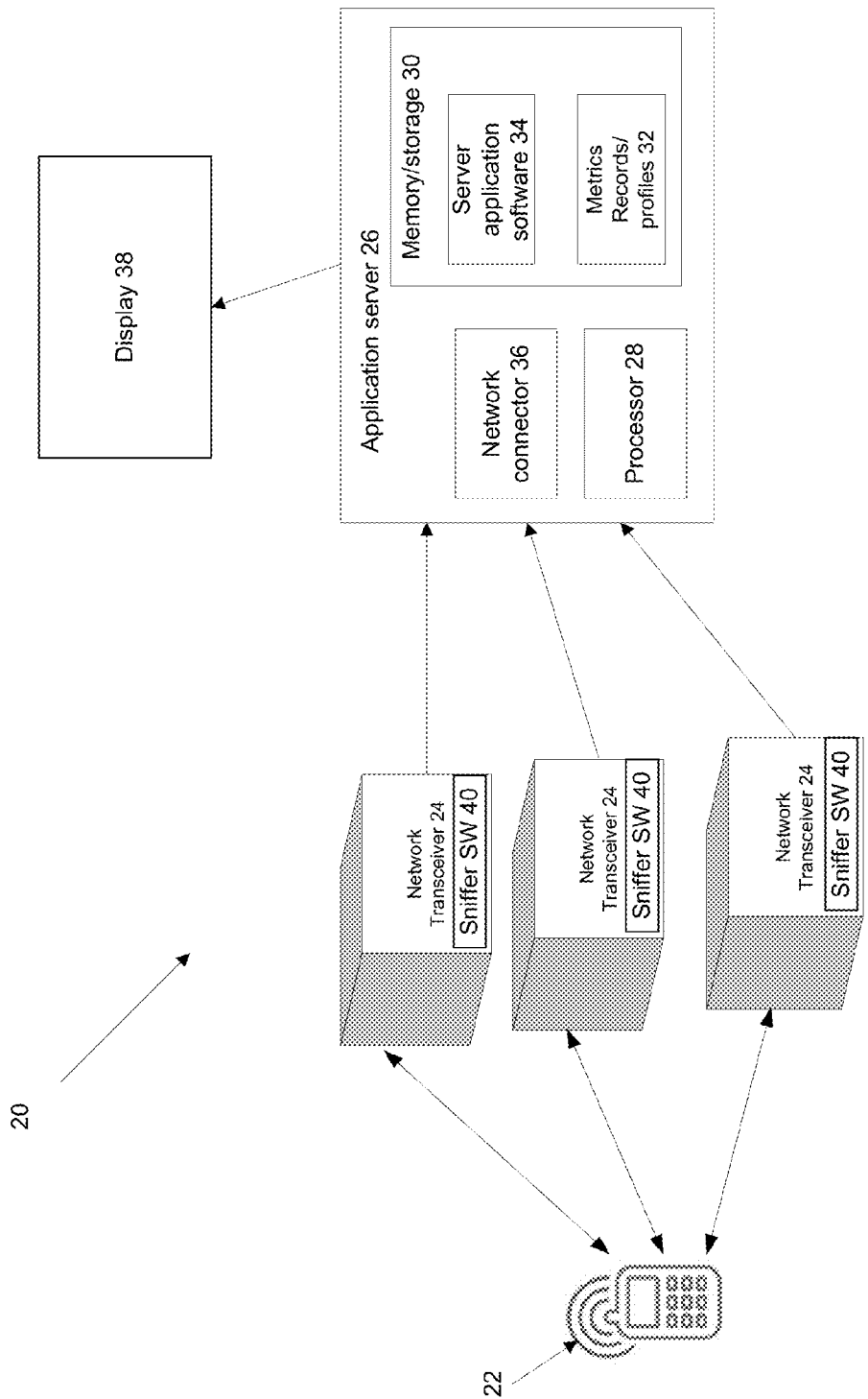
FIG. 1 is an exemplary top-level block diagram illustrating an embodiment of mobile detection system.

FIG. 1 is an exemplary top-level block diagram illustrating an embodiment of mobile detection system 20. The system 20 relates to mobile devices 22 carried on a user's person. The mobile devices 22 are detected by network transceivers 24. Network transceivers 24 are a kind of detection devices or mobile stations (MS) which colloquially can be referred to as fake hotspots or sniffers, and collect identification data from mobile devices 22. Data collected by the fake hotspots 24 is forwarded to an application server 26 via the Internet. The application server 26 includes a processor 28 and a data storage or memory 30 for metrics logging 32 and running application analytical software 34. The results of analysis of the metrics 32 are displayed or rendered to a user on a display 38.

In some embodiments, a dashboard selects and controls data that is received from the network transceivers 24 at the application server 26. The dashboard can control in a distance data captured by the network transceivers 24, new visitor characteristics, history of data used, the number of mobile devices that can be sensed, demographics regarding a selected user, and so on.

The network transceivers 24 may include a plurality of sensors and communicative devices. Examples include wireless fidelity (WiFi) sensors and/or cell signal 2G and Femto sensors for 3G and 4G, for sensing a user's mobile device 22.

Mobile devices 22 emit WiFi signals automatically. WiFi signals carry identifying data including a MAC address (unique ID number), the power of the signal, distance from the network transceiver 24, the brand of the mobile device 22, the name of the mobile device 22 (given by the user) and the network name where the mobile device 22 used to connect.

Cell Signal (2G, 3G, 4G, etc.) emitted by a phone also occur automatically. The network transceivers 24 detect this signal with an active action on regular basis to collect the a MAC address (unique ID number), the SIM card number (IMSI), the power of the signal, distance from network transceiver 24, the carrier, the nationality of the mobile device 22, the applications which attempt to update and the addresses of the web pages already open (or cached) on the mobile device 22.

Cell signal in this case refers to both CDMA and GSM type networks. While normally CDMA networks would not necessarily use mobile devices 22 with SIM cards, SIM cards exist in devices which use 4G LTE signals. Additionally, In the U.S., CDMA carriers use network-based white lists to verify their subscribers. The device 22 will still have a unique ID for the carrier to use for identification.

FIG. 1 includes three network transceivers 24. This is because in order to locate the location of a given mobile device 22, knowing the distance between the desired location and three known locations enables a triangulation calculation to determine the desired location. To triangulate, a minimum of three fake hotspots are required. In practice, a user may want additional fake hotspots scattered throughout a given area, or building to improve coverage or accuracy. At the time of this disclosure, lower quality network transceiver sensors have a roughly ~150 foot range. As the cost of components changes with time the optimal density of network transceivers 24 in to balance effectiveness and cost within a bounded area/building would vary.

The network transceivers may additionally include processors 28 for internal operations and/or for accepting some of the analytical processing load from the application server 26. Transceivers 24 also employ sniffer software 40. Sniffer software 40 includes program operations of the network transceivers 24 as well as network protocol software. Examples of network protocol software include adaptations of OpenBTS (Open Base Transceiver System) and Open-BSC (Open Base Station Controller) with additional features as taught herein. OpenBTS is stable and more complete for GSM and has a release for UMTS (Universal Mobile Telecommunications System). Includes functionality to perform complete man-in-the-middle attacks. It is worth noting that OpenBSC makes use of OpenBTS for the BTS functionalities.

Using OpenBTS software, examples of base model hardware that may be used for the network transceiver are adaptations of communications platforms manufactured by Ettus Research, Fairwaves, and Nuand.

Figure 8:
FIG. 8 is a sample of exemplary mobile device signals.
Figure 8:
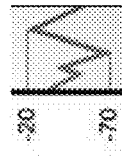
Figure 8:

The WiFi Sniffer software exists on a WiFi card. This sniffer software 40 configures the Wifi Adapter into a monitor mode and displays continuously without any treatment or interruption. All the MAC addresses+RSSI values of devices 22 are detected and no data is thrown away. A pattern length correspond to the quantity of signal captured by the Wi-Fi adapter. The curve representing the RSSI values of these signals is shown in FIG. 8. There is a variation on the signal strength in a given time (less than a second) however when the sniffer software 40 is configured to check every millisecond, the network transceiver captures the majority of the signal emitted by the mobile devices 22.

Some phone brands (ex: Apple) use a randomize MAC address. They will provide a number of fake MAC addresses along with the real one in an attempt to hide the real number.

However, the random MAC addresses change whereas the real one does not. A data filter compares the MAC address for a given mobile device received over a plurality of network connection requests and remove device ID numbers which do not appear repeatedly. Consistent existence of a particular MAC address signifies a real address.

For a cellular signals, there are two distinguishable cases: Idle Mode and Non-Idle Mode. In idle mode, the mobile device 22 performs selection and re-selection of base station to make sure that the mobile device 22 is attached with the best possible channel to the carrier network. In non-idle mode, a mobile device 22 with a point to point active call will perform base station handover to assure that the call is not dropped.

In order to encourage the mobile device 22 to choose to identify to the network transceivers 24, the mobile device 22 has to reselect the cell managed by the network transceiver 24 and push to identify/authenticate. A set of criteria are defined in the standards mobile phone regarding this selection/re-selection procedure. BCCH frequency scan: mobile device 22 phone scans a set of frequencies to detect a BCCH to camp on. Criteria for cell eligibility to be selected or re-selected. Cells include timing information. In some embodiments, every 5s the network transceiver 24 shall calculate the parameters for the serving cell and for non-serving cells.

GSM, UTRAN, LTE (2G, 3G, 4G) cell reselection is feasible. Therefore, within the sniffer software 40, are programmed unique approaches for each. According to the network requests, a network transceiver 24 provides specific identification parameters to a fake network e.g. IMSI or, IMEI. The network initiates the identification procedure by transferring an IDENTITY REQUEST message to the network transceiver 24 and starts a timer T3270. The IDENTITY REQUEST message specifies the requested identification parameters in the identity type information element. The IMSI and/or IMEI may be requested.

In some embodiments, the data network includes a wired data network and/or any category of conventional wireless communication networks, for example, radio, Wireless Fidelity (Wi-Fi), cellular, satellite, and broadcasting networks. Exemplary suitable wireless communication technologies include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT) and others.

The sensors can acquire a media access control (MAC address), signal strength, timestamp of probes received, and so on from the mobile device. In some embodiments, the sensors can be integrated into the display device and/or placed as a separate unit collecting data metrics per location and uploading to the central server. Additional sensors improve the accuracy of the wireless metrics as well as cover multiple areas within a location. Other sensors that can be used include Bluetooth, GSM/2G, and so on.

Figure 2:
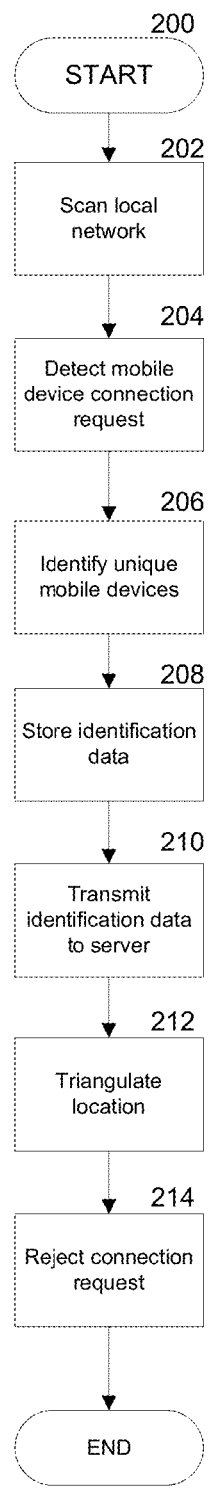
FIG. 2 is a flowchart illustrating a method of detecting a mobile device.

FIG. 2 is a flowchart illustrating a method of detecting a mobile device. In step 202, when turned on, the sniffer software 40 scans different frequencies (WiFi, Cellular, etc.) and collect the information broadcasted from the different PLMNs' (Public Land Mobile Networks) cells, including the adjacent cells. The network transceivers 24 will also use this phase to take the necessary measurements to determine constants.

In step 204, the sniffer software 40 periodically catches all the IDs of the local mobile devices 22 in the zone of activity for the network transceiver 24. The period is identified by CATCHER_PERIOD and is determined based on the experimental measurements (number of active PLMNs and corresponding cell characteristics in the zone of activity). Broadcast for a duration CATCHER_DURATION_PER_PLMN BCCH information on a frequency adjacent to the GSM range while interfering, if the tests show this necessary on the corresponding list of stored BCCH. The power of transmission CATCHER_TRANSMIT_POWER_PER_PLMN is computed with precision based on the collected information.

In step 206, a radio resource (RR) connection with each mobile station attached to the current PLMN and request identification. The different mobile devices 22 shall respond with the requested IDs: TMSI, IMSI and/or IMEI. In step 208, the collected IDs are stored and in step 210, the mobile device 22 ID's are transmitted to the application level and the application server 26.

In step 212, based on the communication between the mobile device 22 and the network transceivers 24, the mobile device's location is triangulated. In step, 214, the network transceiver 24 terminates the RR connections requesting from mobile devices 22 to return to the previous BCCH.

Figure 3:
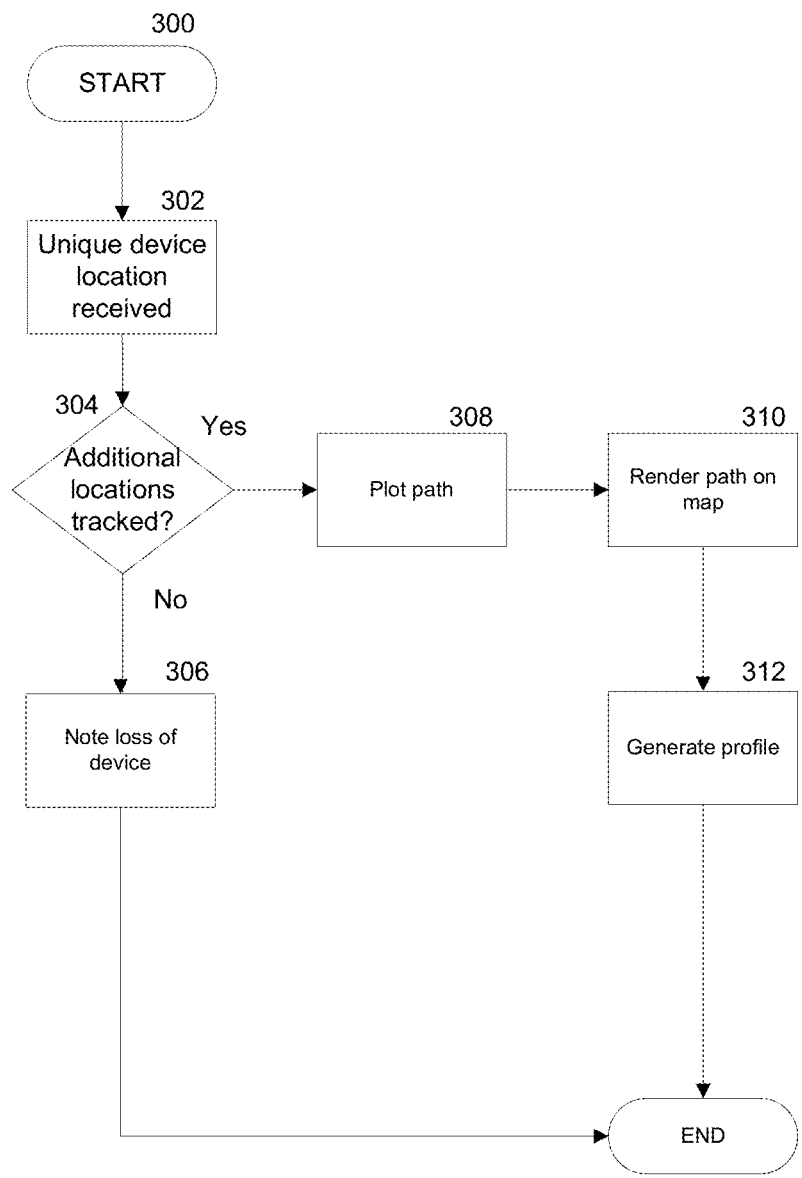
FIG. 3 is a flowchart illustrating a method of tracking a mobile device.

FIG. 3 is a flowchart illustrating a method of tracking a mobile device. In step 302, a first data set from the method of FIG. 2 is collected by the sniffer software 40 and/or the server's application software 34. Then, in step 304, the software 40 determines whether or not additional locations are tracked for the same mobile device 22 (cycling through some of the steps of FIG. 2 over again). The determination of whether or not the same device is discovered is through comparison of the identification data received in repeated cycles of the method of FIG. 2.

In step 306, if the given mobile device 22 is no longer detected, the software 34, 40 notes the loss of the mobile device. In step 308, if the given mobile device 22 remains in contact, the multiple locations are plotted as a path. If the mobile device 22 has not moved, the path includes a wait time or a "mill around in substantially the same area time."

In step 310, the path is rendered on a map of the area supported by the network transceivers 24. In step 312, a profile is generated for that given mobile device's 22 ID information. The profile may include data such as: average visit duration (recent and historical), average dwell time, bypassing traffic, and path taken, new versus recurring visitors (recent and historical).

In some embodiments, the sensors report recent statistics 32 for the approaching user back to the central server 26. Advantageously, movement of the approaching user can be determined, for example, using MAC readings and calculating the distance to a selected sensor, taking into account signal-strength of a particular reading. Low-signal strength readings can be filtered to reduce noise.

The central server 26 can include one or more probe controllers and/or location controllers (not shown). The probe controllers process the aggregate information from all sensors 24 and image capturing devices (not shown). The location controllers provide analytics for backend historical data as well as end-point data for real-time, recurring visitor decisions. Readings can be stored in a database using any conventional data mapping methods. For example, readings stored include, but are not limited to, signal strength (e.g., received signal strength indication (RSSI), timestamp, location ID, International Mobile Station Equipment Identity (IMEI), gender, attention time, timestamp, age, and proximity readings.

In some embodiments, the central server 26 provides a dashboard to enable secured-access for an administrator. For example, HTTP secure connections can be used and transport layer security/secure sockets layers can be used to provide authenticated access to the administrator. Additionally and/or alternatively, two-factor authentication can be used to provide a token and/or password to the administrator.

Once the administrator is authorized, the dashboard allows the administrator to select and control the data that is received at the central server 26. The administrator can access the dashboard at the central server 26 or through the data network.

Figure 4:
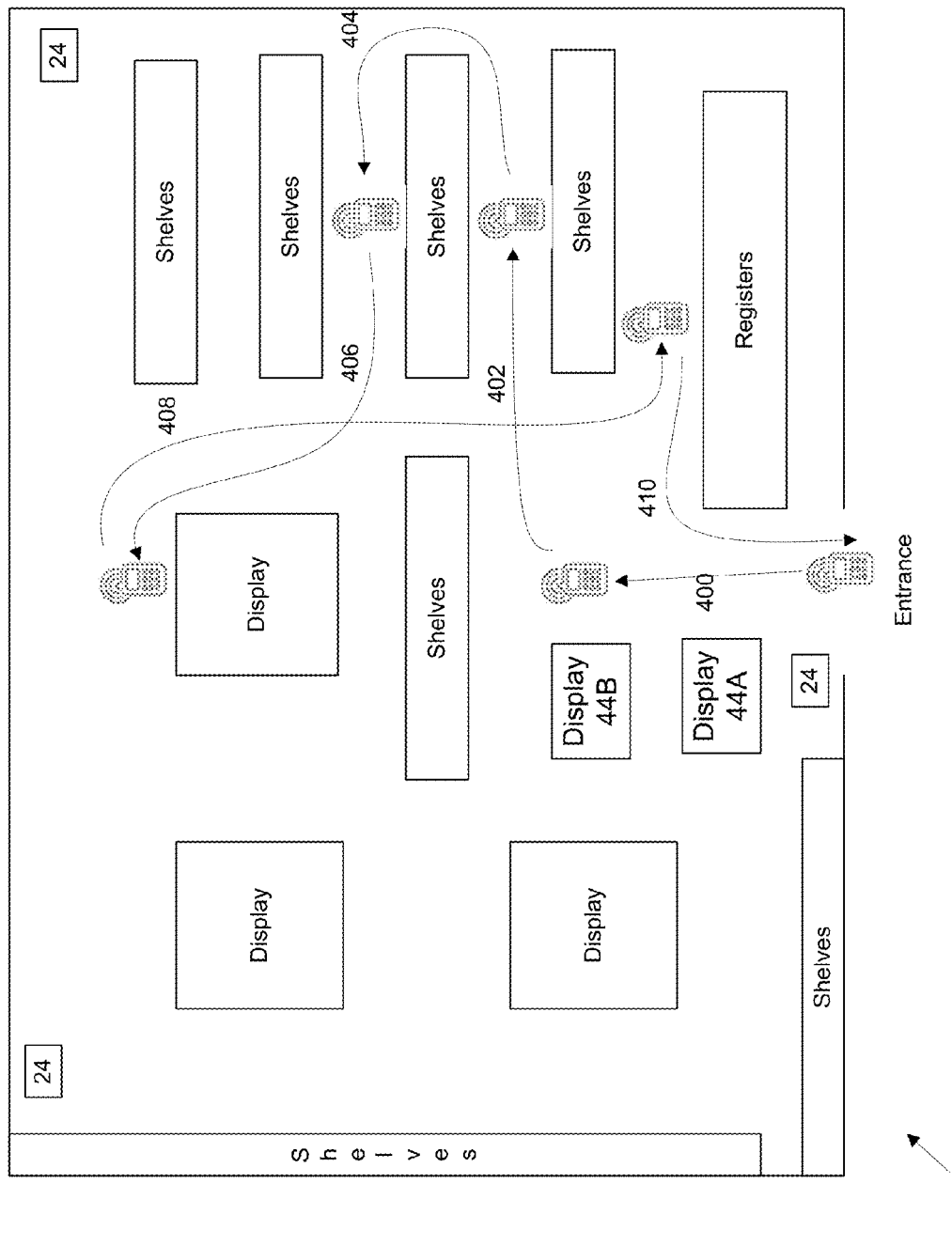
FIG. 4 is an exemplary sequence diagram tracking a mobile device through a store.

FIG. 4 is an exemplary sequence diagram tracking a mobile device through a store. The technology of analyzing people in real time can be used for an efficient communication strategy in public environments (e.g., in corporate and campus locations). For example, organizations can adjust advertisements through collected metrics and analytic data.

In some embodiments, additional sensors are integrated into the system 20. The more metrics collected, the better. Metrics are combined with advanced indexing and search algorithms, aggregations and stochastics in order to provide the most complete insight into real-time audience demographics.

The exemplary process details providing analytics based on the real-time analysis of the proximate audience (e.g., approaching users, crowd, and so on). The central server 26 can determine if the approaching user is recurring or a "new visitor" based on aggregations of all the above-mentioned metrics. Stated in another way, the frequency of a user's visits is determined by creating a digital "footprint" of the user based on the metrics collected. In some embodiments, personal data is not stored and the digital identifiers stored are associated with a particular MAC address. MAC addresses and devices can be aggregated based on a time-slot (e.g., recent time slots include the last 2-minutes).

Each reading from the relevant time-slot can be filtered by signal strength to determine mobile devices that are in actual proximity. These devices can be further filtered beginning from the current time-slot and extending to an N-minute period after that (usually 24 hours in the past) which is in turn fully configurable. This can be used to determine whether a user is a recurring visitor. For additional security, digital identifiers can be encrypted and/or hashed.

Displayed in FIG. 4 is a store 42. The store 42 includes a number of network transceivers 24. The sequence steps 400-410 illustrate a single person's path through the store as mapped and rendered by the motion of their mobile device 22.

In sequence 400, the user enters the store 42 and goes straight past the first display 44A, and stops at the second display 44B. The analytic data derived from this can be that this one user of many was not interested in the display 44A. Instead this user's interests were elsewhere.

In sequence steps 402 through 406 the user is tracked weaving through shelves. A marketer seeing this data can make determines about the traffic flow in the store to potentially improve the natural routing of customers through the store. In sequence 408, the user has obtained what they intend to purchase and heads to the register, pays, then in step 410 the user leaves.

The analytics also indicate how long the user spent at the registers, and if they were in line, how the line was bunching up. This data can be used to further improve the orientation or management of the store 42.

Figure 5:
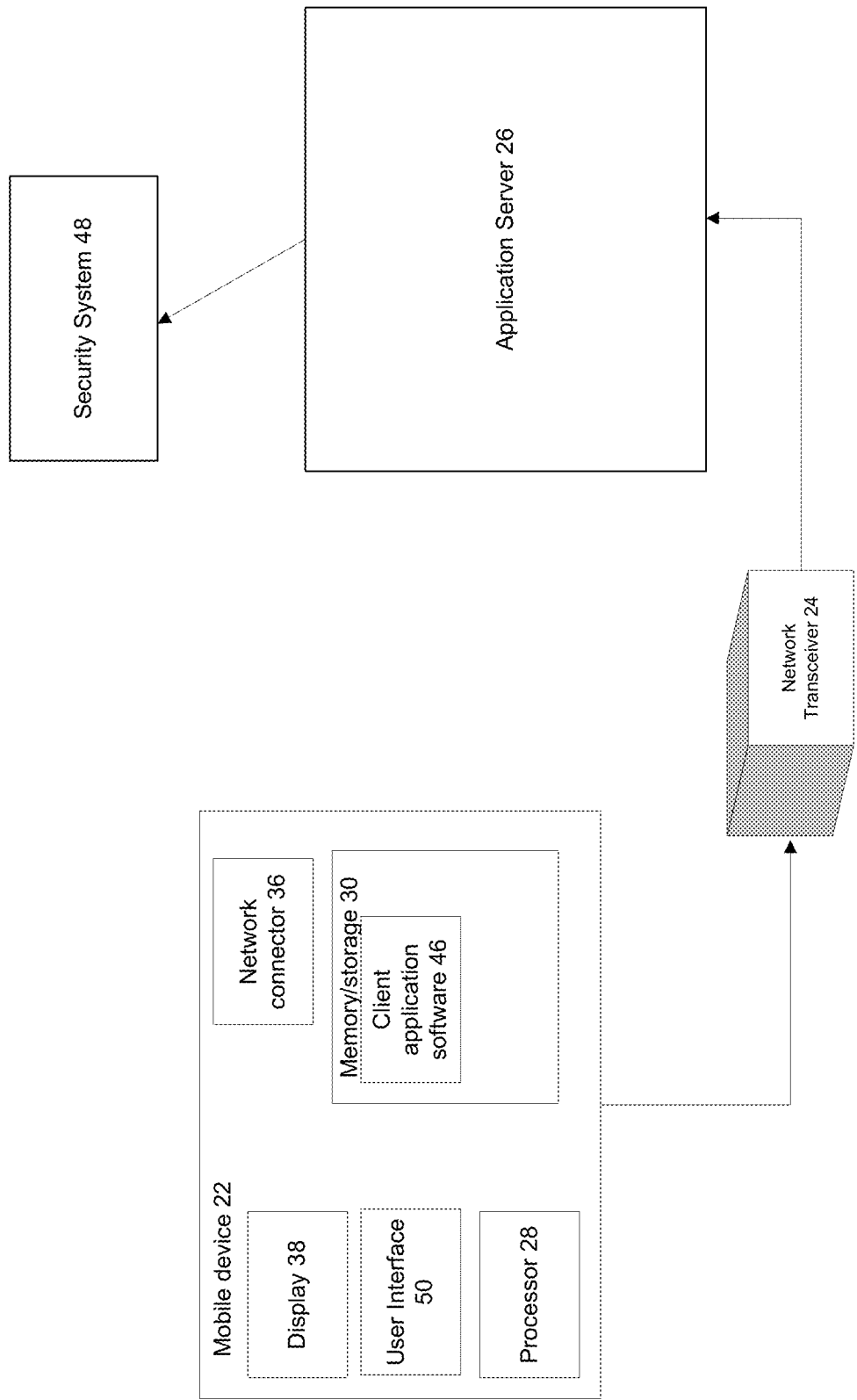
FIG. 5 is an exemplary top-level block diagram illustrating an embodiment of mobile detection system integrated with a security system.

FIG. 5 is an exemplary top-level block diagram illustrating an embodiment of mobile detection system integrated with a security system 48. Here the mobile device 22 further includes installed client software 46. This embodiment differs from prior discussed embodiments where no such software was necessary in order for data to be collected. The client software 46 is not necessary for the security system 48 to work, but is one embodiment. What is necessary is that the security system is able to recognize the given mobile device 22 as associated with a given person or unknown through a IFF (identification friend or foe).

This can be done through a client application 46 programmed to embed the IFF data in the information that the user expects the network transceiver 24 to collect through the described "sniffing" process. As noted, the network transceivers 24 collect application names. The client application 46 is programmed to rename itself to a code which will be recognized as an IFF signal. Alternatively, the security system 48 may include a white-list of MAC addresses, and no client application 46 is necessary, and the IFF signal is instead merely the MAC address.

Here, data collected in the application server 26 is analyzed and directions are sent by the application server 26 to the security system 48 in order to cause security actions to occur (ex: inform law enforcement, automatically lock doors, turn on lights, deliver messages, turn on cameras, activate traps, etc.).

Figure 6:
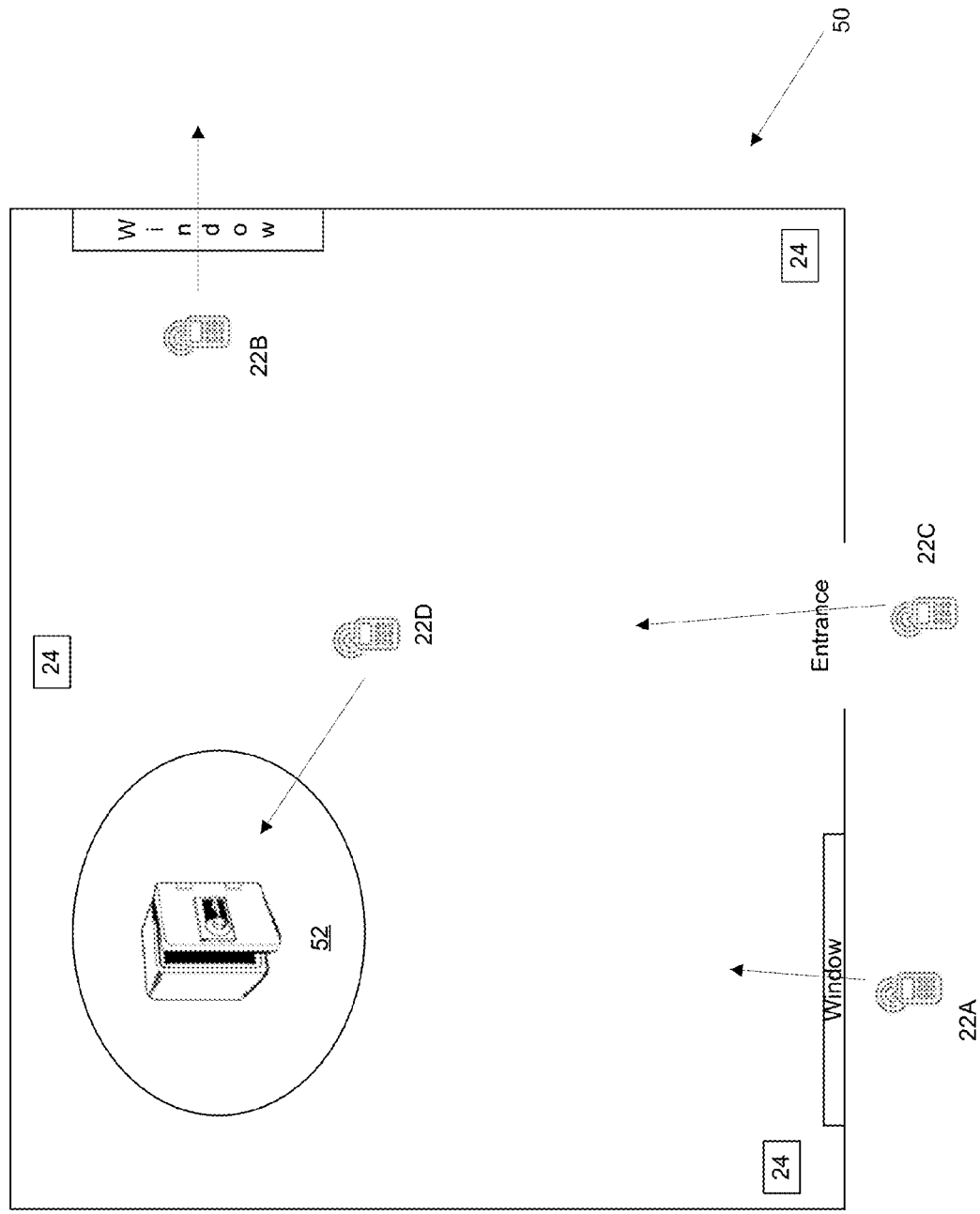
FIG. 6 is an illustrative implementation of a mobile device tracking system integrated with a security system.

FIG. 6 is an illustrative implementation of a mobile device tracking system integrated with a security system 48. Here there is a secure facility 50. The secure facility may be any number of buildings: a domicile/house, an office building after hours, a bank, a military installation, or other region for which ingress and egress may be restricted. A number of sample stories are illustrated for which the technology herein addresses.

The mobile device 22A is entering the secure facility 50 through a window. The velocity of the device 22A is heading in rather than leaving which is generally frowned upon in decent society. The security system 48 may first check for an IFF signal, and absent the signal trigger the system. In a domicile, this may be a burglar. The security system can capture the burglar's phone data, turn on security cameras, and call the police. Similar actions can be taken if an unknown device 22A is milling around outside the window.

The mobile device 22B is leaving through a window. Similarly in a domicile, this is not generally considered normal. Potentially "little Timmy" is sneaking out when he shouldn't be. In addition to the velocity of mobile device 22B, the time of day can be taken into account for such actions. Hypothetically, Timmy is allowed to leave through his window to get to his tree house during daylight, but not at 2 am. So here even if a IFF signal is received, some other condition may override the IFF signal. Alternatively, IFF signals may not all be created equal. Mobile devices owned by Timmy's parents would not trigger the security system 48, while the device owned by Timmy 22B does. In this circumstance, the security system 48 may send a text message to Timmy's parent's mobile devices and the parents then head outside to confront the little miscreant.

The mobile device 22C is entering straight through the front door of the secure facility 50. If the secure facility 50 is a business which should not be receiving visitors at 2 am, the security system 48 may be triggered. It's possible that the mobile device 22C has been tracked loitering around the secure facility 50 before and had been potentially casing the place. Upon that same device 22C approaching the main entrance, or any other entrance, the security system 48 is triggered.

The mobile device 22D is headed towards a valued zone 52. As before and IFF signal may prevent the security system 48 from being triggered. Alternatively, without an IFF signal, and given a set of behavior/loitering in the valued zone 52 the security system 48 may trigger. Example actions include locking surrounding doors or dropping a cage trap over the valued zone 52 thereby sealing a thief in to await the authorities.

Figure 7:
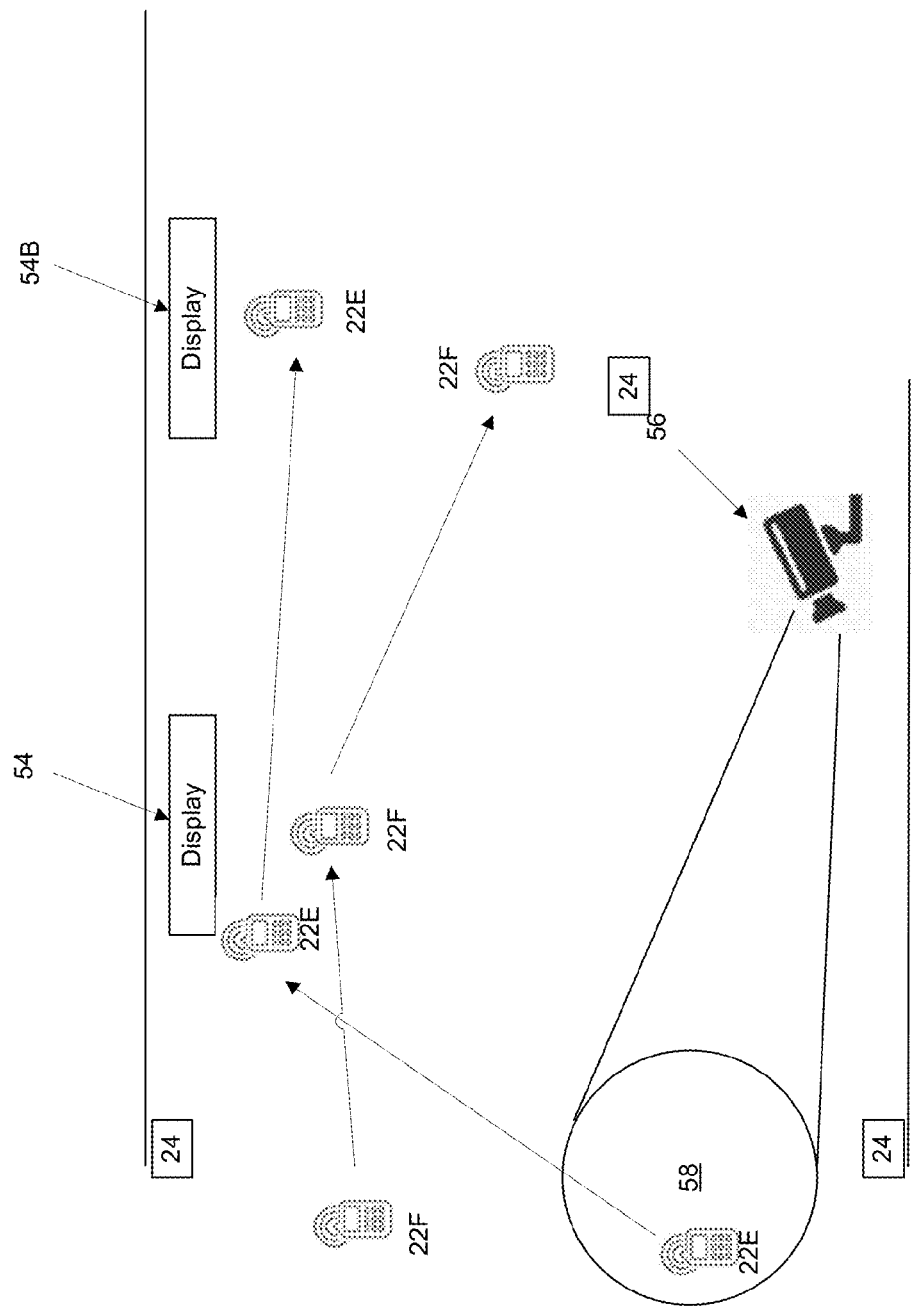
FIG. 7 is an illustrative implementation of a mobile device tracking system integrated with a marketing display system.

FIG. 7 is an illustrative implementation of a mobile device tracking system integrated with a marketing display system. Digital content includes the information that is to be displayed on the digital signs. Content can include text, images, animations, video, audio, and, in some cases, user interfaces. In many digital sign applications, content must be regularly updated to ensure that the correct messages are being displayed. This can either be done manually, as and when needed, and/or through a scheduling system, using a data feed from a content provider.

The digital display 54 uses real time interaction. Mobile devices 22 in front of the digital display 54 are in movement see the information when they are present in front of the screen. Compared to static content, interactive content can be expensive to install and requires content that is deemed useful to the target audience to produce a return on investment. Although content on digital signs can rotate/update in seconds, the content is typically targeted to a large group of potential observers (e.g., travelers at an airport, sports fans at a stadium, and so on) without a specific user in mind. Accordingly, conventional digital signage systems include poor content and, often, an improper type or location of displays. Fresh, dynamic content that is attractive and engaging to an approaching user at the time and place where the digital sign can affect the success of a particular marketing effort and bring real time feedback to operator or else.

As discussed above, conventional digital signage systems include poor content and, often, an improper type or location of displays. Therefore, the digital signage system can dynamically update content from the central server, for example, based on an approaching user.

Readings related to the digital footprint is passed in real-time (matter of seconds) to the digital signage system, which in turn determines the correct corresponding advertisement to display. This data is used to trigger promotional actions or coupons to reward recurring visitors for example. A virtual cookie can be created for the detected user to provide target advertising via the digital content. The digital content can be displayed on the display device 54 and/or the mobile device 22 (i.e. upon entering a store or a section in the store coupons can be sent to a client application software 46).

As discussed above, profiles 32 are generated for mobile devices 22 which pass through an area serviced by network transceivers 24. The profiles 32 are linked to a MAC address rather than the person, or a phone number. A person whom changes devices would not inherently have a profile 32, though some embodiments include means for merging the profile 32 of a prior MAC address with the profile 32 associated with the MAC address of another device.

The MAC address can be paired with other data which is collectable through other scanners to further develop the profile 32. One example includes pairing camera footage to known locations of a mobile device 22. When a given mobile device 22E enters into view 58 of the camera 56, the camera 56 takes pictures of whomever is holding the mobile device 22E. These pictures are added to the profile associated with the MAC address of mobile device 22E. The pictures taken can be analyzed using photo recognition software for approximations of height, age, gender, and facial features.

Additional logic of photo analysis can be applied to a temporary profile associated with the mobile device 22E. For example, if the camera 56 captures an image while mobile device 22E is in frame of a parent and a child, the profile 32 for mobile device 22E can be updated to note that the owner of mobile device 22E is presently having to care for a child. This detail may expire because the next time mobile device 22E returns, the owner may not have their child with them.

When mobile device 22E moves in front of a digital display 54, marketing information or other content pertaining to the profile of mobile device 22E is presented on the screen 54 or played through associated display speakers 54. In a further illustrative example, the carrier of mobile device 22E (parent) approaches a digital display 54 and a cartoon intended to distract or placate the child begins to play on the display 54. The parent (and mobile device 22E by association) move away from the first digital display 54 and approach a second display 54B. The cartoon ceases to play on the first display 54, but picks up from where it ended on the second display 54B. Through the transfer of the cartoon, the child is drawn to stay close to their parent, and remains distracted.

Cameras are not the only sensor that can be used to fill out a profile 32 for a mobile device 22. In addition, purchase data can be combined into a mobile device profile 32. In order to do this, imagine a store which is serviced by a set of network transceivers 24. Programmed into the tracking logic, sniffer software 40, or server application software 34 is the location of the store registers. When a mobile device 22 approaches the register, purchase data is uploaded from the store to the mobile device profile 32 (such as the name on a credit card, or what the person bought).

It is contemplated that it may be difficult to assign any given transaction with a particular mobile device 22F in crowded stores, and thus error detection and outlier logic is used. For example, a mobile device 22F approaches a register, and while at that location, 3 transactions occur in the store. It is a fair assumption that one of those transactions is associated with mobile device 22F. If mobile device 22F returns to the store on another occasion and similarly approaches the registers again, the purchases made at this time are compared to the purchases made when mobile device 22F was at the registers previously. If a credit card is used that is issued to the same name as previously, it is likely that the owner of mobile device 22F is also the owner of that credit card.

In this way, profiles 32 may be merged between mobile devices 22. If a new mobile device 22 appears to use a given credit card, the credit card has either been stolen, shared, or the user purchased a new mobile device 22. Differentiating from those options can be done over time by building the profile 32 for each mobile device, and by comparing to external data sources (has the mobile device or credit card been reported stolen? Are two mobile devices 22 commonly seen with one another?). In an example in FIG. 7, mobile device 22F has become associated with the regular purchase of a particular brand of beer. When mobile device 22F approaches the digital display 54, the display alerts the user that the favored beer brand has gone on sale.

Furthermore, the digital signage system uses the image capturing devices to ascertain visual metrics. The image capturing devices can include optical cameras and sensors. Additionally and/or alternatively, image capturing devices can include, but are not limited to, any number of contact image sensors, electro-optical sensors, infra-red sensors, kinetic inductance detectors, light-emitting diode (LED) as light sensors, fiber optic sensors, optical position sensors, photodetectors, pressure sensors, photoresistors, phototransistors, thermal or temperature sensors, proximity sensors, electric current sensors, magnetic sensors, radio sensors, and so on. The image capturing devices detect, for example, faces, age, gender, mood, proximity of the approaching user, and even the approaching user's attention time. Similar to the sensors, the image capturing devices can be integrated into the display device and/or placed as a separate unit.

The central server can interface with the digital signage system in a variety of ways. For instance, to provide digital content to the digital signage system, the central server can interface via extensible markup language (XML), really simple syndication (RSS), media RSS, hypertext transfer protocol (HTTP), file transfer protocol (FTP), and real-time messaging services.

Figure 9:
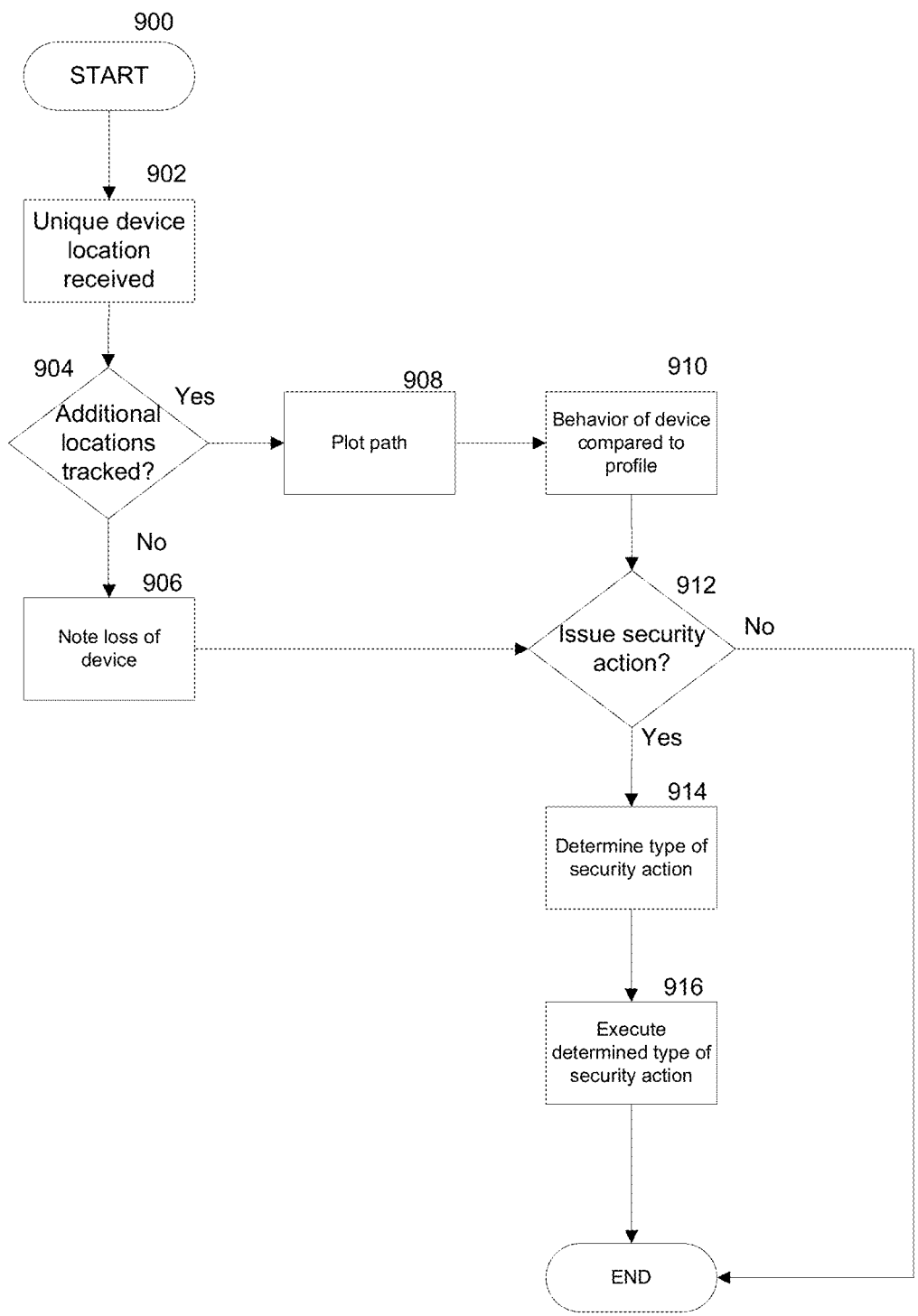
FIG. 9 is a flowchart illustrating a method of tracking a mobile device integrated with a security system.

FIG. 9 is a flowchart illustrating a method of tracking a mobile device integrated with a security system. Similar to FIG. 3, the network transceivers 24 collect one or more data points about the mobile devices 22 within range. In step 906, if a mobile device 22 suddenly vanishes from tracking that perhaps should have vanished based on predetermined security profiles, a potential security action may occur in step 912.

Alternatively, in step 910, a plotted path (both present and historical) of a mobile device 908 is compared to danger profiles. In step 912, if a danger profile appears to have been met or if a mobile device 22 mysteriously vanished that shouldn't have the security system 48 may trigger.

In step 914 if the security system 48 triggers, the system must determine an appropriate action. Actions are chosen based upon which danger profile was matched and what kind of secure facility 50 is being monitored. In step 916, the chosen action is executed by the security system 48.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

The invention claimed is:

1. A system for tracking individuals' presence and route through a building via collecting information about network connected devices held by the individual, the system comprising:
   at least three network transceivers positioned proximate to or inside a building configured for human occupation, the network transceivers configured to wirelessly communicate with mobile devices attempting to connect to a wireless network, collect identification data from those mobile devices a plurality of times, and subsequently deny communicative connection between the network transceivers and said mobile devices;
   a server communicatively connected to the network transceivers and configured to receive identification data collected by the network transceivers and use said identification data to identify unique mobile devices and track movement of the mobile devices through the building via triangulation.

2. The system of claim 1, wherein the wireless network is a Wi-Fi network.

3. The system of claim 2, wherein the identification data includes a mobile device MAC address and a manufacturer of the mobile device.

4. The system of claim 1, wherein the wireless network is a cellular data network.

5. The system of claim 4, wherein the identification data includes a mobile device MAC address and a manufacturer of the mobile device, a SIM card number, a carrier, a registered country, a list of installed applications with network updates, a list of cached web pages on the mobile device.

6. The system of claim 1, further comprising:
   beacon application software installed on a particular mobile device which embeds an identification friend or foe (IFF) signal in the identification data; and wherein the server triggers a security system upon receiving identification data and location data of a mobile device which does not include an embedded "friend" IFF signal and at least one other condition.

7. The system of claim 6, wherein the at least one other condition is any of:
   location of the mobile device within a bounded zone;
   time the mobile device is detected within a predetermined range;
   velocity of the mobile device within predetermined range;
   mobile device identification data included on a black list; or
   mobile device information data includes an embedded "foe" IFF signal.

8. A method for tracking individuals presence and route through a building, the method comprising:
   detecting, by at least three detection devices, a connection request signal from a mobile device, the connection request signal configured to facilitate a connection to a wireless network, the connection creating a communicative link between the detection devices and the mobile device;
   storing identification data contained in the connection request signal from the mobile device;
   rejecting the connection request between the detection devices and the mobile device;
   transmitting the identification data to a server;
   identifying, by the server, unique mobile devices that make connection requests to the detection devices; and
   identifying the location of the unique mobile device through triangulation of the identification data.

9. The method of claim 8, wherein the wireless network is a WiFi network.

10. The method of claim 9, wherein the identification data includes a mobile device MAC address and a manufacturer of the mobile device.

11. The method of claim 8, wherein the wireless network is a cellular data network.

12. The method of claim 11, wherein the identification data includes a mobile device MAC address and a manufacturer of the mobile device, a SIM card number, a carrier, a registered country, a list of installed applications with network updates, a list of cached web pages on the mobile device.

13. The method of claim 8, wherein the steps are performed a plurality of times, and the method further comprising:
   tracking a path taken by the mobile device by plotting a plurality of the identified locations of unique mobile devices on a map.

14. The method of claim 13, further comprising:
   displaying, the path taken by the mobile device superimposed on images of a zone serviced by the detection devices.

15. The method of claim 13, further comprising:
   triggering a security system upon detecting an unrecognized mobile device and satisfaction of at least one other condition.

16. The method of claim 15, wherein the at least one other condition is any of:
   identified location of the mobile device within a bounded zone;
   time the mobile device is detected within a predetermined range;
   velocity of the mobile device within predetermined range; or
   mobile device identification data included on a black list.

17. The method of claim 13, further comprising:
   generating a behavior profile for each unique mobile device based upon the tracked path taken.

18. The method of claim 11, further comprising:
   displaying, on a monitor proximate to the mobile device, a message relevant to the identification data.

19. A system for tracking individuals presence and route through a building, the system comprising:
   at least three detection devices positioned proximate to or inside a building configured for human occupation, the detection devices configured to receive network connection requests from mobile devices attempting to connect to a wireless network, collect identification data from those mobile devices a plurality of times, and subsequently deny communicative connection between the network transceivers and said mobile devices;
   a server communicatively connected to the detection devices and configured to receive identification data collected by the detection devices and use said identification data to identify unique mobile devices and track movement of said mobile devices through the building via triangulation.

20. The system of claim 19, wherein the building is a commercial store including marketing displays.

21. The system of claim 19, wherein the building is a domicile with a security system.

22. The system of claim 19, further comprising:
   a data filter configured to compare identification data for a given mobile device received over a plurality of network connection requests and remove device ID numbers which do not appear repeatedly.

* * * * *